US006153888A

United States Patent [19]

Fournier et al.

[11] Patent Number: 6,153,888

[45] Date of Patent: *Nov. 28, 2000

[54] AUTOMATIC CONTROL OF REFLECTIVE-TYPE SENSORS IN REPRODUCTION APPARATUS

[76] Inventors: John C. Fournier; John P. Marcelletti, both of 343 State St., Rochester, N.Y. 14650

[ * ] Notice: This patent is subject to a terminal disclaimer.

[21] Appl. No.: 09/188,640

[22] Filed: Nov. 9, 1998

[51] Int. Cl.[7] .......... G01N 21/86

[52] U.S. Cl. ..........

[52] U.S. Cl. .......... lp;1p250/559.4; 250/559.45; 250/205; 356/429

[58] Field of Search .......... 250/559.4, 559.45, 250/559.46, 205; 356/429, 430

[56] References Cited

U.S. PATENT DOCUMENTS

| | | | |
|---|---|---|---|
| 3,167,739 | 1/1965 | Girard et al. | 340/939 |
| 4,200,391 | 4/1980 | Sakamoto et al. | 399/47 |
| 4,406,996 | 9/1983 | Oka | 340/674 |
| 4,577,096 | 3/1986 | Beery et al. | 250/205 |
| 4,687,919 | 8/1987 | Nagano | 250/205 |
| 5,283,424 | 2/1994 | Acquaviva et al. | 250/205 |
| 5,805,292 | 9/1998 | Fournier et al. | 356/429 |

*Primary Examiner*—Stephone B. Allen
*Assistant Examiner*—Thanh X. Luu
*Attorney, Agent, or Firm*—Lawrence P. Kessler

[57] ABSTRACT

A control system for an optical sheet sensor device, including at least one light emitter and at least one light detector associated therewith for sensing a sheet in a sheet travel path for automatically controlling the sheet sensor device in order to provide an intensity of light from the light emitter to compensate for varying background reflectance and background-to-light emitter distance. The control provided for determining a light emitter current level corresponding to an operating condition where a sheet is known to be absent from the sheet travel path and where there is a close, reflective background to the light emitter. A light emitter current operating level corresponding to a reduced level with respect to the above determined current level is stored. A current startup error level at a preset amount off-set from the stored current level is determined. Current is applied to a light emitter, the applied current being increased toward a level at which the threshold level for the light detector is exceeded. The instantaneous applied current level is compared with the determined startup error current level, and an error signal is provided when the light intensity threshold is reached prior to the applied current level exceeding the determined current level. If the determined startup error current level is exceeded by the applied current level prior to the light intensity reaching the light intensity threshold, the light emitter is operated at the applied current level.

3 Claims, 5 Drawing Sheets

AUTOMATIC CONTROL OF REFLECTIVE-TYPE SENSORS IN REPRODUCTION APPARATUS

BACKGROUND OF THE INVENTION

The present invention relates in general to control of reflective-type sensors in reproduction apparatus, and more particularly to an automatic control system for reflective-type sensors.

In typical commercial electrostatographic reproduction apparatus (such as copier/duplicators, printers, or the like), a latent image charge pattern is formed on a uniformly charged charge-retentive or photo-conductive member having dielectric characteristics (hereinafter referred to as the dielectric member). Pigmented marking particles are attracted to the latent image charge pattern to develop such image on the dielectric member. A receiver sheet is then brought into contact with the dielectric member, and an electric field applied to transfer the marking particle developed image to the receiver sheet from the dielectric member. After transfer, the receiver sheet bearing the transferred image is transported away from the dielectric member, and the image is fixed (fused) to the receiver sheet by heat and pressure to form a permanent reproduction thereon.

Such reproduction apparatus utilize receiver sheet sensors to determine sheet width, length, or position of a sheet along a sheet transport path. Additionally, receiver sheet sensors may be used at various locations along the sheet transport paths to determine sheet jam conditions. One commonly used type of sheet sensor comprises a light emitter/light detector pair. Generally the light emitter is an LED (light emitting diode) used as a transmitter of radiant energy, and a photocell, photodiode or phototransistor which receives the radiant energy and produces a signal indicative thereof. The sheet sensor can be either reflective or transmissive. That is, with the reflective type sensor, a sheet moves past an emitter and reflects light to an adjacent detector; while with the transmissive type sensor, a sheet moves between the emitter and detector and blocks the radiant energy from the emitter. Reflective type sensors are preferred because of their ability to detect transparent sheet material (i.e., transparencies).

It is important that the sheet sensors function properly in order to assure that information is reproduced on receiver sheets in a manner which provides user acceptable copies. Moreover, misfeeds and/or multifeeds of receiver sheets must be reliably detected in order to prevent major malfunctions of the reproduction apparatus. While sheet sensors of the above described type are relatively simple and easy to employ in typical reproduction apparatus, they are susceptible to control intricacies due to the fact that each sensor may be "seeing" a different background. That is, the background material that each sensor is looking at may be of a different reflectivity, and the distance to such background material may be different.

SUMMARY OF THE INVENTION

In view of the foregoing discussion, this invention is directed to a control system for an optical sheet sensor device, including at least one light emitter and at least one light detector associated therewith for sensing a sheet in a sheet travel path for automatically controlling the sheet sensor device in order to provide an intensity of light from the light emitter to compensate for varying background reflectance and background-to-light emitter distance. The control system provides for determining a light emitter current level corresponding to an operating condition where a sheet is known to be absent from the sheet travel path and where there is a close, reflective background to the light emitter. A light emitter current operating level corresponding to a reduced level with respect to the above determined current level is stored. A current startup error level at a preset amount off-set from the stored current level is determined. Current is applied to a light emitter, the applied current being increased toward a level at which the threshold level for the light detector is exceeded. The instantaneous applied current level is compared with the determined startup error current level, and an error signal is provided when the light intensity threshold is reached prior to the applied current level exceeding the determined current level. If the determined startup error current level is exceeded by the applied current level prior to the light intensity reaching the light intensity threshold, the light emitter is operated at the applied current level.

The invention, and its objects and advantages, will become more apparent in the detailed description of the preferred embodiment presented below.

BRIEF DESCRIPTION OF THE DRAWINGS

In the detailed description of the preferred embodiment of the invention presented below, reference is made to the accompanying drawings, in which.

DETAILED DESCRIPTION OF THE INVENTION

Figure 1:
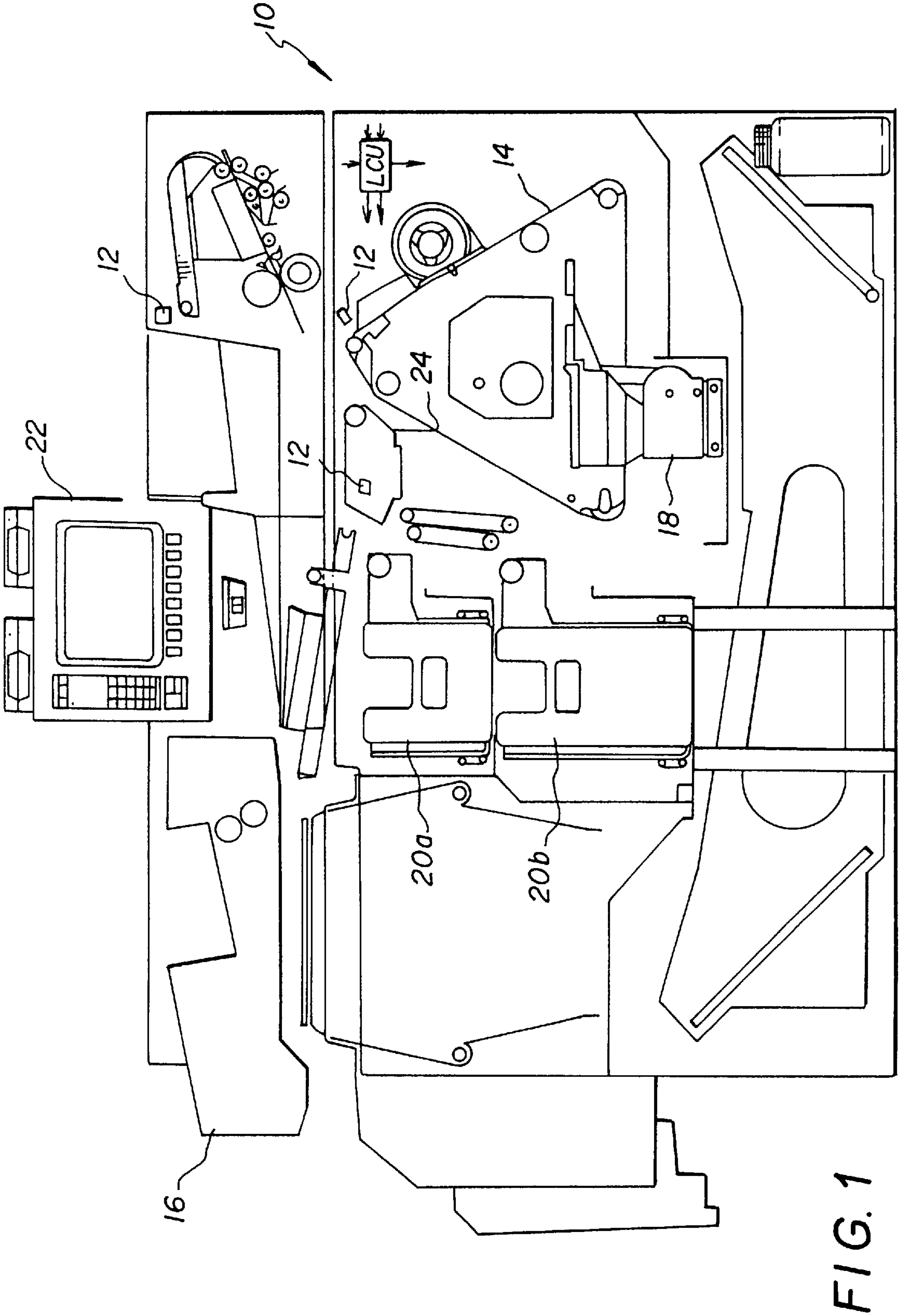
FIG. 1 is a schematic illustration of a typical reproduction apparatus employing at least one receiver sheet sensor device including the automatic intensity adjustment for the light emitters thereof, according to this invention.

Referring now to the accompanying drawings, FIG. 1 shows a typical reproduction apparatus, designated by the numeral 10, employing a plurality of receiver sheet sensor devices 12, and including the automatic control according to this invention. Although this invention is suitable for use with any reproduction apparatus having light emitter/detector type sheet sensors, the typical reproduction apparatus 10 as shown is an electrostatographic reproduction apparatus. The reproduction apparatus 10 includes a charge-retentive or photoconductive member having dielectric characteristics (hereinafter referred to as the dielectric member 14). The dielectric member 14 is uniformly charged, and a latent image charge pattern corresponding to information to be reproduced is formed thereon. The information to be reproduced may be contained in documents presented for copying by the feeder 16.

Pigmented marking particles from a development station 18 are attracted to the latent image charge pattern on the dielectric member 14 to develop such latent image. A receiver sheet fed at an appropriate time from a supply tray (20*a* or 20*b*) is then brought into contact with the dielectric member 14, and an electric field applied to transfer the marking particle developed image to the receiver sheet from the dielectric member. After transfer, the receiver sheet bearing the transferred image is transported away from the dielectric member 14, and the image is fused to the receiver sheet by heat and pressure to form a permanent reproduction thereon.

In order to control the reproduction apparatus 10, the reproduction apparatus includes a logic and control unit (LCU) which receives input signals from an operator communication interface 22 and a plurality of appropriate sensors (not shown) associated in any well known manner with the electrographic stations of the reproduction apparatus 10. Based on such signals and a program for the microprocessor, the LCU produces appropriate signals to control the various operating devices and stations within the reproduction apparatus. The production of a program for a number of commercially available microprocessors is a conventional skill well understood in the art, and do not form a part of this invention. The particular details of any such program would, of course, depend upon the architecture of the designated microprocessor.

As is apparent, one of the operations within the reproduction apparatus 10 which must be sensed is the location of a receiver sheet as it travels through the reproduction apparatus. Such location is important so as to be sure that the information to be copied, in the form of the developed image on the dielectric member 14, is appropriately placed on the receiver sheet to form an acceptable reproduction, and that operation of the reproduction apparatus is interrupted in the event that there is a missed or multitude of receiver sheets. For example, as shown in FIG. 1, the location of a receiver sheet is sensed when the sheet is in the registration assembly 24. Of course, the receiver sheet location may be sensed at many other significant locations along the sheet travel path, such as entering the travel path from a supply tray or exiting the travel path after a developed image has been fused thereto.

Figure 2:
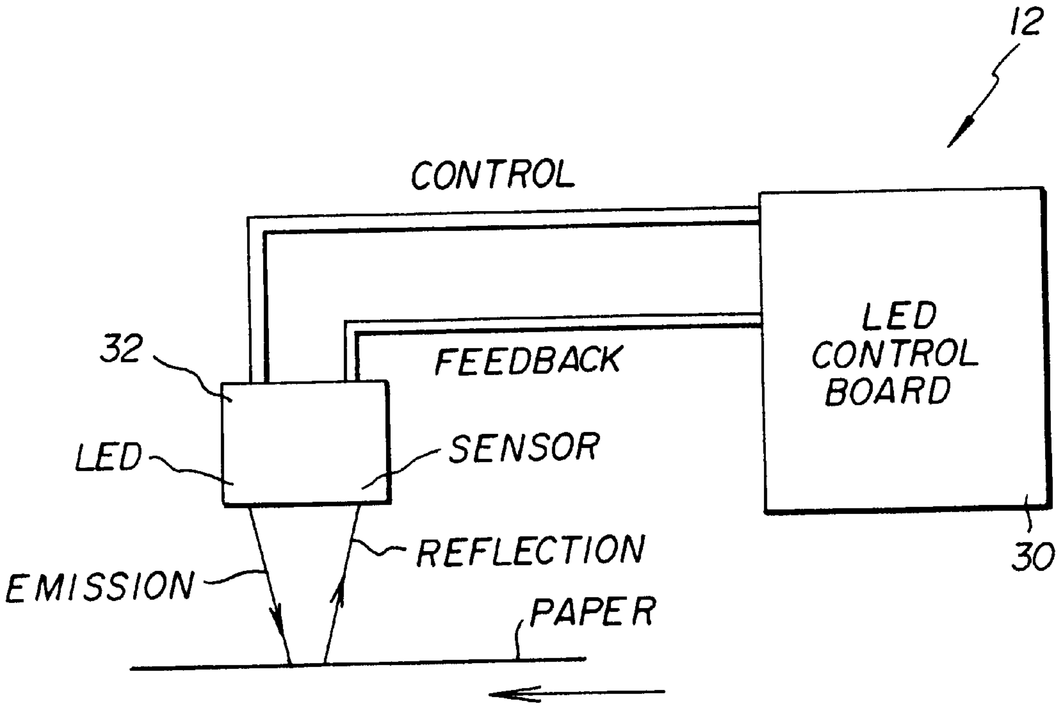
FIG. 2 is a schematic illustration of a reflective type receiver sheet sensor device, including the automatic control thereof, according to this invention.

FIG. 2 shows a reflection type sensor device 12 suitable for detecting receiver sheets as the sheets travel through the reproduction apparatus. The reflective type sensor, designated as sensor 12R, includes a combination light emitter and detector 32 is positioned on one side of a receiver sheet travel path P. Under the control of a digital logic control device 30, appropriate signals are sent to the combination light emitter and detector 32 to turn the emitter portion on (at a predetermined intensity level) and off, while the detector portion communicates with the digital logic control device 30 to feed back detection signals based on the intensity of light reflected from a sheet in the travel path P (typically, the light is only reflected when a sheet is present adjacent to the emitter and detector).

Figure 3:
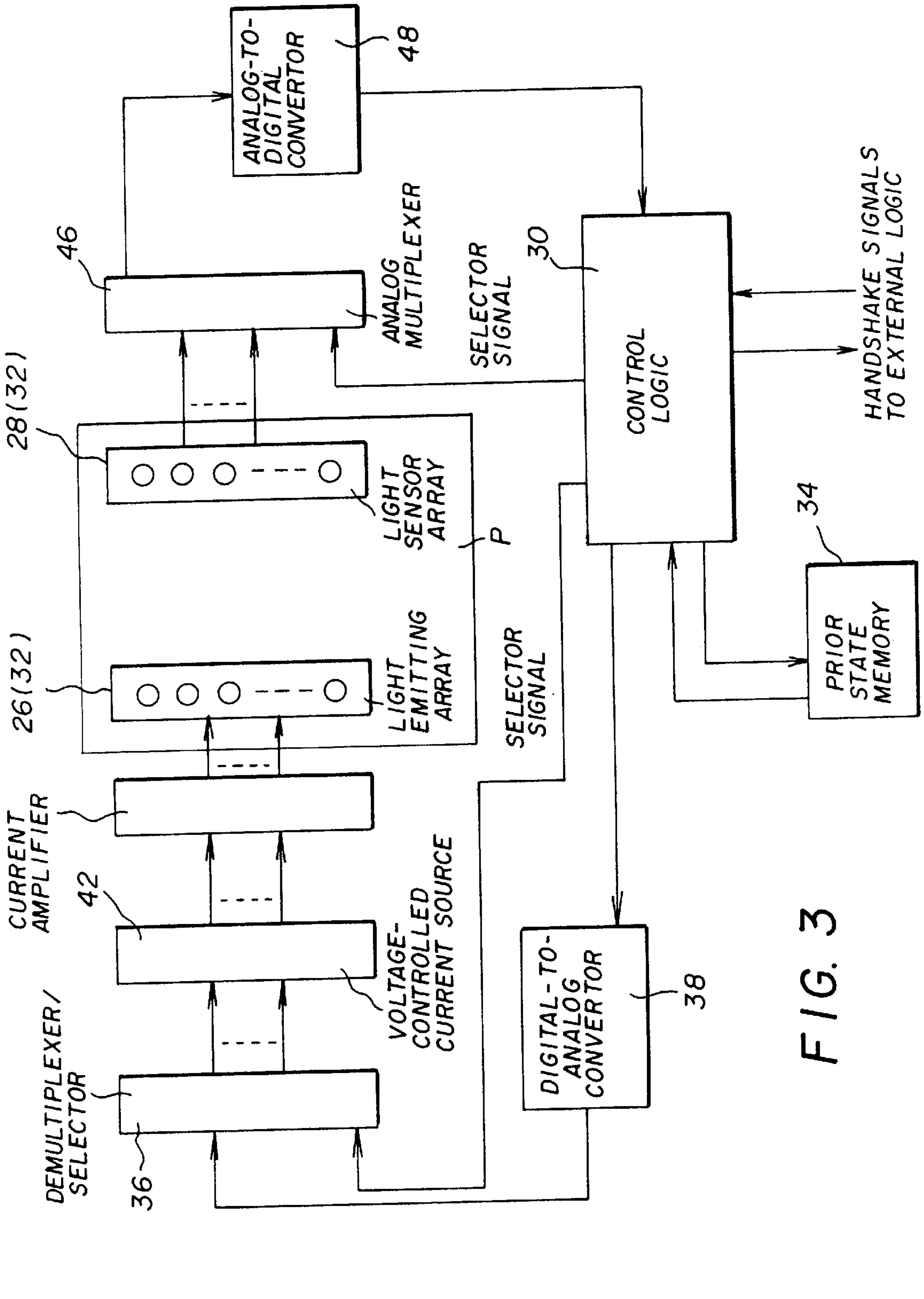
FIG. 3 is a block diagram of the control for the receiver sheet sensors of FIG. 2.

FIG. 3 is a block diagram of the control for the receiver sheet sensor devicesl2, and in particular for the automatic control thereof, according to this invention. An array of light sources such as an LED, and an array of light detectors, such as phototransistors, photodiodes or photocells are controlled and monitored by a digital logic control device 30. The digital logic control device 30 communicates the instant sensor state and any error messages with the logic and control unit L of the reproduction apparatus 10. It also maintains a non-volatile memory 34 which contains a history of prior states of the controlled LED array and associated responses from the detectors. The digital logic control device 30 will output a particular selection signal to the demultiplexer/selector 36 to choose which LED (or LED's) in the array is to be controlled. It will then output a digital signal to the digital-to-analog converter 38. An analog voltage from the converter 38 is communicated to the demultiplexer/selector 36, which in turn is sent to the appropriate channel of the voltage-controlled current source 42. The appropriate channel of current source 42 is fed to the current amplifier 44, which in turn drives the chosen light(s) in the light emitter array (e.g., output device 26 or 32).

The light emitted from the light emitter array (output device 26 or light emitter portion of element 32) is passed across the sensing channel (i.e., the receiver sheet travel path P) to the sensor array (detector 28 or light detector portion of element 32). The output signal from the sensor array is passed to an analog multiplexer 46 under the control of the digital logic control device 30. The analog signal from the multiplexer 46 is converted to a digital signal by an analog-to-digital converter 48, which signal is sent to the digital logic control device 30. In the simplified case of a single digital bit signal, the analog-to-digital converter 48 could be reduced to a level comparator circuit.

Figure 6:
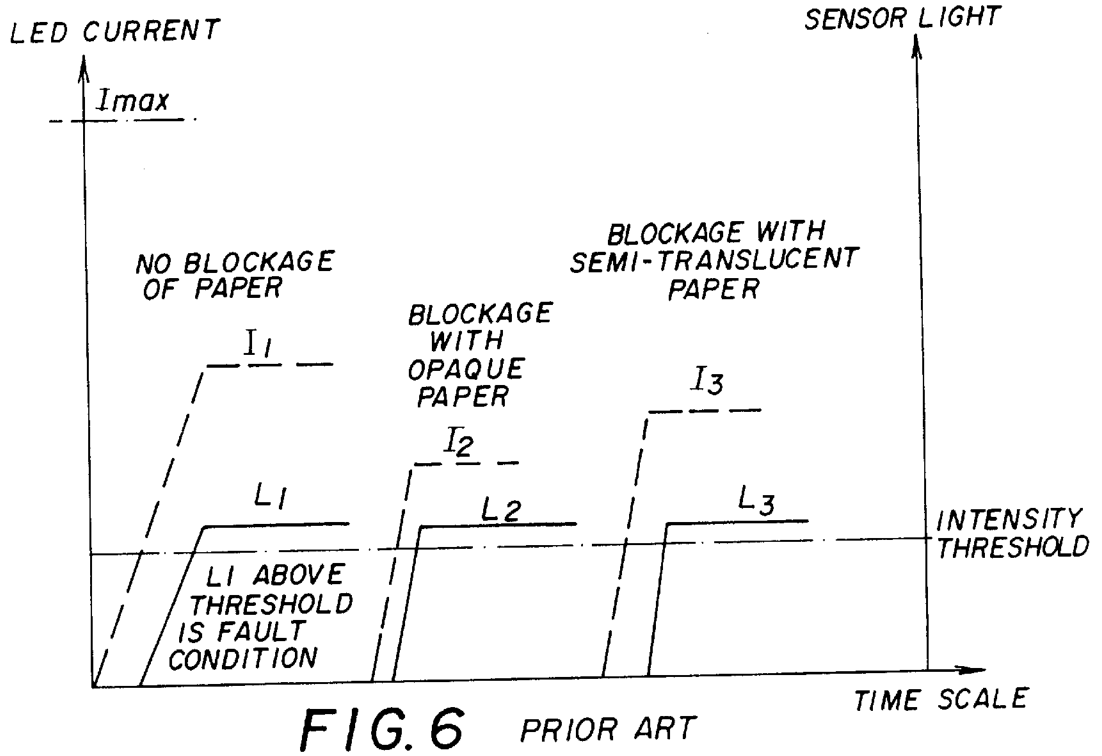
FIG. 6 PRIOR ART
Figure 7:
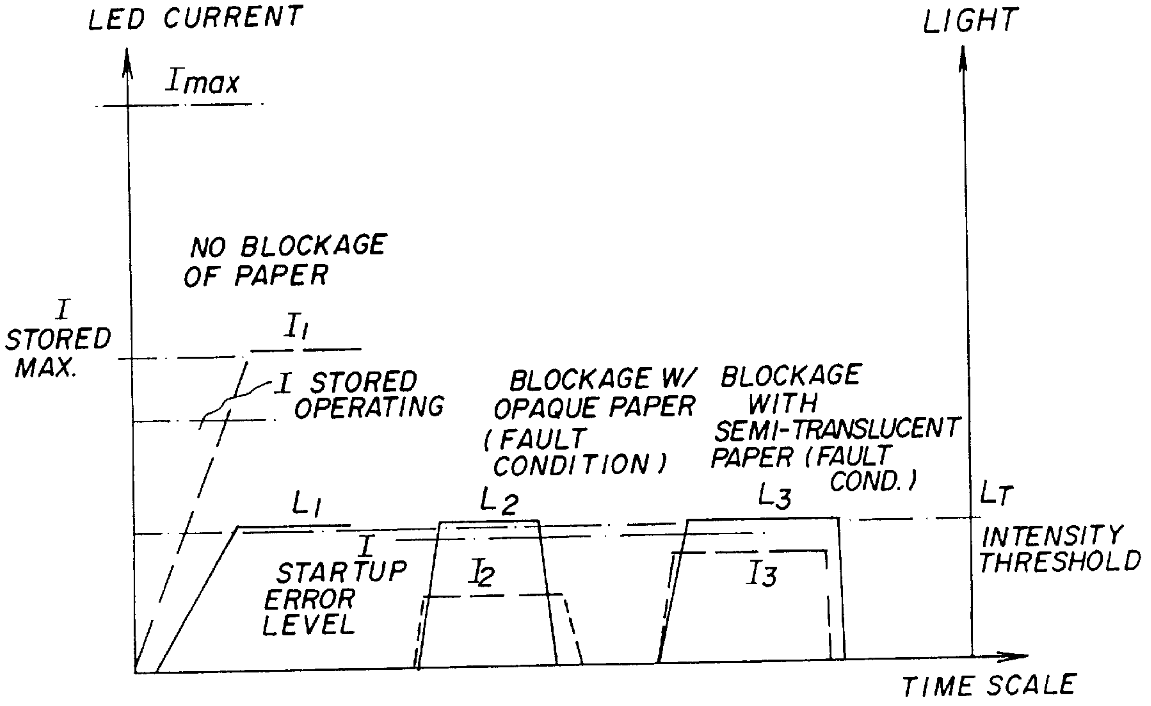

Optical receiver sheet sensor devices of the reflective type have a set of fixed operating parameters for both the emitter of light and the light detector. They are thus sensitive to operating parameter variations caused by contamination over the optical surfaces, such as dust, and aging of the components that affect light sensitivity or detection efficiency. Additionally, they function differently based on background reflectivity and distance from the background surface. The graphs of FIGS. 4 and 6 illustrate, for two distinct operating conditions, the time response of prior art reflective type sheet sensor automatic control systems, and the graphs of FIGS. 5 and 7 illustrate the time response of a reflective type sheet sensor automatic control (depicted in FIG. 2) according to this invention.

Figure 4:
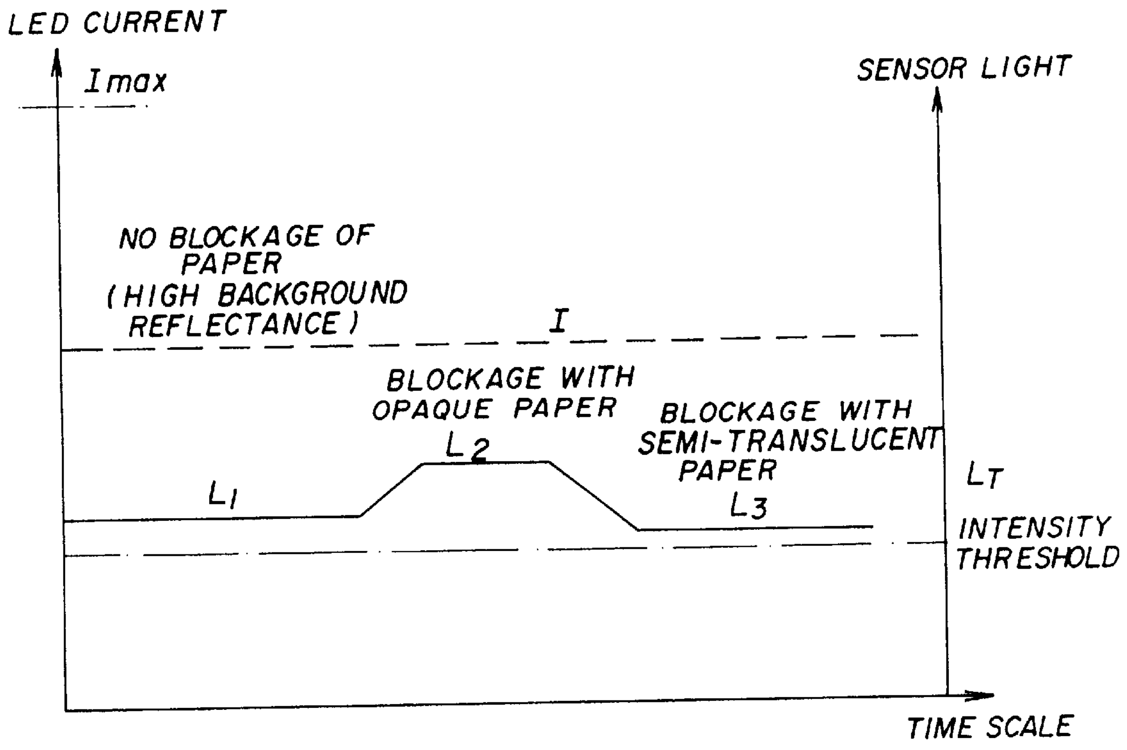
FIG. 4 PRIOR ART
FIGS. 4 and 6 are graphical representations of the response time, under different conditions, for prior art receiver sheet sensor devices.

In the graph of FIG. 4, for the first (i.e., normal) operating condition, the prior art approach to control the light emitting sheet sensor devices for various receiver sheet light reflectance properties with a high background reflectance is shown. At the left portion of the graph is the steady state value of LED current I (proportional to light output intensity of the light emitter), and the light intensity $L_1$ reflected from the background and received at the light detector. The light received is analogous to the voltage measured with a phototransistor as the detector. The LED current I, is the current that the control system requires to make the steady-state detector light level $L_1$ exceed the threshold level $L_T$ of the detector. This condition exists until the system is blocked by an opaque receiver sheet. The light level at the detector begins to rise until it reaches the level $L_2$ which is above the threshold level $L_T$. The control system will thus provide a signal to the reproduction apparatus that a receiver sheet is indeed present at the sensor. If a sheet is somewhat translucent to light (e.g., light-weight sheet or transparency), the output of the light detector will assume the level $L_3$ which is less than the background level L1 or the opaque sheet level $L_2$. The level $L_2$ is still above the threshold level $L_T$.

If the background reflects enough light, the detector light level $L_1$ may attain a value above the threshold level $L_T$, and the control system will assume a receiver sheet, even though not present in fact, is being detected. This condition represents a significant error in the control system of the prior art, and inhibits the system from being able to provide control for a wide range of backgrounds and distances of the detectors devices from such backgrounds.

Figure 5:
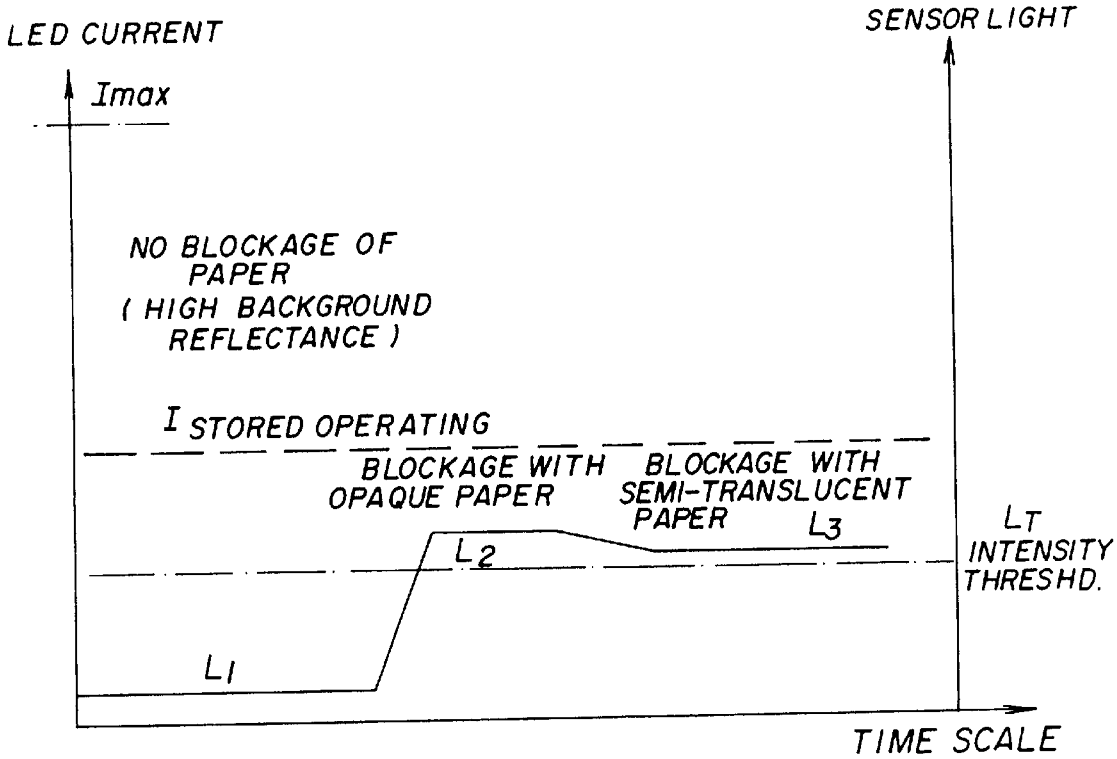
FIGS. 5 and 7 are graphical representations of the response time, under different conditions, for the receiver sheet sensor device including the automatic control for the light emitters thereof, according to this invention.

On the other hand, in the graph shown in FIG. 5, the sheet sensor automatic control, according to this invention, for the same receiver sheet transmission properties is shown. The steady-state LED current $L_{stored\ operating}$, which has been previously set during the power-up sequence (to be described below), has resulted in the detector light level $L_1$ with no receiver sheet blockage. Such level is below the threshold level $L_T$. With the introduction of an opaque receiver sheet, the light level rises to the detector light level $L_2$ above the threshold level $L_T$, and the control system signals a receiver sheet blockage. When a semi-translucent receiver sheet is introduced, the detector light level drops relative to the level $L_2$, but only to the level $L_3$, which will still be above the threshold level $L_T$. This is because the steady-state LED current level $I_{stored\ operating}$, determined at power-up, represents the LED current for a light detector level signal with no sheet present, and may therefore be held constant. Changes in the light detection level above the threshold level $L_T$ thus always result in the control system providing a signal that a receiver sheet has been detected at the sensor.

The second of the two operating conditions concerns the system at power-up and initialization. As is common with reproduction apparatus, a receiver sheet jam may cause an operator to power down the reproduction apparatus with the jammed receiver sheet still present in the receiver sheet travel path. In a power-up condition, neither the prior art sheet sensor control system nor the sheet sensor automatic control according to this invention know immediately whether a receiver sheet was jammed or left in the travel path at a sensor at the last shutdown of the reproduction apparatus. In graph of FIG. 6, the three examples of no receiver sheet, an opaque receiver sheet, and a semi-translucent receiver sheet are shown with the prior art sheet sensor control system response upon a power-up condition. With no receiver sheet present, the control system responds normally, and stabilizes at the normal steady-state levels; that is, LED current level $I_1$ and detector light level $L_1$ from a given background. If the light level $L_1$ is above the threshold level LT than a fault condition is established. That is, the control system will incorrectly recognize the background as a sheet present condition. With an opaque receiver sheet blocking the sensor, the LED current once again will rise in an attempt to bring the detector light level above the threshold level $L_T$ necessary to provide a signal to the control system indicating presence of a sheet at the sensor. If the receiver sheet is opaque, the detector light level $L_2$ would exceed the threshold level $L_T$ as the LED current level $I_2$ attains a value below that of current level $I_1$, and allow the control system to signal an error condition (i.e., a jammed sheet left in the sheet travel path at the sensor). In the final instance shown in the graph of power-up, with a semi-translucent receiver sheet, the LED current will adjust to the level $I_3$ (higher than level $I_2$), which is sufficient to bring the LED light level $L_3$ above the threshold level $L_T$, and allow the control system to similarly signal an error condition.

With the sheet sensor automatic control according to this invention, power-up and initialization response occurs in the following described manner to overcome the above problem of the prior art system. As shown in the graph of FIG. 7, an LED current level value $L_{STORED\ MAXIMUM}$ from the last known operating valid operating condition of a particular background, where the light level $L_1$ is reached which slightly exceeds the light intensity threshold $L_T$, is stored in the permanent, non-volatile memory 38. The LED current is then decreased to a current $I_{STORED\ OPERATING}$. In the instance of an opaque receiver sheet blocking the sensor, the LED current rises to bring the detector light level above the threshold level $L_T$ necessary to provide a signal to the control system indicating presence of a sheet at the sensor. An LED current level $I_{STARTUP\ ERROR\ LEVEL}$ is calculated upon power-up and will generally be of a pre-set amount below the stored level $I_{STORED\ OPERATING}$. Since the amount of change in light intensity required normally varies only very slightly from power-up cycle to power-up cycle, the LED current level $I_{STARTUP\ ERROR\ LEVEL}$ signal is quite simply derived empirically from the previous LED current level $I_{STORED\ OPERATING}$ value. Trends in the calculated error signals and the variations in the normal steady-state LED current level signals may be identified, and stored in the memory 38 as an operational history of the light emitters and light detectors.

Under normal operating power-up and initialization, when a sheet is detected, the LED current level to bring the detected reflected light level above the threshold level $L_T$ should not reach a level above the LED current level $I_{STARTUP\ ERROR\ LEVEL}$. As such, if the threshold level $L_T$ is reached prior to the LED current level $I_2$ attaining the level $I_{STARTUP\ ERROR\ LEVEL}$ value, then it has been determined that a receiver sheet is blocking the sensor. An error message will then be sent to the reproduction apparatus machine control indicating that a jammed receiver sheet is present in the sheet travel path at the sensor. In the instance of blockage of the sensor by a semi-translucent receiver sheet, due to the particular predetermined LED current level $I_{STARTUP\ ERROR\ LEVEL}$, the amount of light reflection will still be enough to maintain the LED current level $I_3$ below the level $I_{STARTUP\ ERROR\ LEVEL}$ when the light level $L_3$ reaches the threshold level $L_T$. Accordingly, this will also signal the error condition. The blocking receiver sheet can then be safely removed from the sensor area and, once the sheet has been removed, the control system responds again as in the unblocked sensor example. The above setup for power-up and initialization can readily be repeated for each sheet detector so that respective backgrounds, and different distances to the backgrounds, is automatically compensated for with each sensor.

The invention has been described in detail with particular reference to preferred embodiment thereof, but it will be understood that variations and modifications can be effected within the spirit and scope of the invention as set forth in the claims.

What is claimed is:

1. In a reflective optical sheet sensor device including at least one light emitter and at least one light detector associated therewith having a light intensity threshold level above which the presence of a sheet in a sheet travel path is sensed, a method for automatically controlling said sheet sensor device in order to provide an intensity of light from said light emitter to compensate for varying background reflectance and background-to-light emitter distance, said control method comprising the steps of:

(a) determining a light emitter current level corresponding to an operating condition where a sheet is known to be absent from said sheet travel path and where there is a close, reflective background to said light emitter;

(b) storing a light emitter current operating level corresponding to a reduced level with respect to a light emitter current level as determined in step (a);

(c) determining a startup error current level at a preset amount off-set from said stored current level;

(d) applying current to said at least one light emitter, said applied current being increased toward a level at which said light intensity threshold level for the light detector, receiving reflected light from said light emitter, is exceeded;

(e) comparing an instantaneous current level, as applied in step (d), with said determined startup error current level, and providing an error signal when said light intensity threshold level of said light detector is reached prior to said applied current level exceeding said determined startup error current level; and (f) if said determined startup error current level is exceeded by said applied current level prior to the light intensity reaching said light intensity threshold level of said light detector, operating said light emitter at said stored operating current level.

2. In a reflective optical sheet sensor device including at least one light emitter and at least one light detector associated therewith having a light intensity threshold level above which the presence of a sheet in a sheet travel path is sensed, a control system for said sheet sensor device for automatically controlling said sheet sensor device in order to provide an intensity of light from said light emitter to compensate for varying background reflectance and background-to-light emitter distance, said control system comprising:

a first determination device for determining a light emitter current level corresponding to an operating condition where a sheet is known to be absent from said sheet travel path and where there is a close, reflective background to said light emitter, and producing a signal corresponding thereto;

a storage device for storing a signal representing a light emitter current operating level corresponding to a reduced level with respect to a light emitter current level signal as produced by said first determination device;

a second determination device for determining a startup error current level at a preset amount off-set from said stored current level;

a device for applying current to said at least one light emitter, said applied current being increased toward a level at which said light intensity threshold level for the light detector receiving reflected light from said light emitter, is exceeded; and a comparator for comparing an instantaneous current level, as applied by said current applying device, with said determined startup error current level, and providing an error signal when said light intensity threshold level of said light detector is reached prior to said applied current level exceeding said determined startup error current level, and if said determined startup error current level is exceeded by said applied current level prior to the light intensity reaching said light intensity threshold level of said light detector, operating said light emitter at said stored operating current level.

3. An optical sheet sensor device comprising:

at least one light emitter;

at least one light detector associated with said light emitter having a light intensity threshold level above which the presence of a sheet in a sheet travel path is sensed; and a control system for said sheet sensor device, said control system including a first determination device for determining a light emitter current level corresponding to an operating condition where a sheet is known to be absent from said sheet travel path and where there is a close, reflective background to said light emitter, and producing a signal corresponding thereto, a storage device for storing a signal representing a light emitter current operating level corresponding to a reduced level with respect to a light emitter current level signal as produced by said first determination device, a second determination device for determining a startup error current level at a preset amount off-set from said stored current level, a device for applying current to said at least one light emitter, said applied current being increased toward a level at which said light intensity threshold level for the light detector, receiving reflected light from said light emitter. is exceeded, and a comparator for comparing an instantaneous current level, as applied by said current applying device, with said determined startup error current level, and providing an error signal when said light intensity threshold level of said light detector is reached prior to said applied current level exceeding said determined startup error current level, and if said determined startup error current level is exceeded by said applied current level prior to the light intensity reaching said light intensity threshold level of said light detector, operating said light emitter at said stored operating current level.

* * * * *